United States Patent [19]

Kobayashi et al.

[11] Patent Number: 4,877,537

[45] Date of Patent: Oct. 31, 1989

[54] PUMPING SYSTEM FOR GATES

[75] Inventors: Ichiji Kobayashi; Motohide Sakata, both of Saga, Japan

[73] Assignee: Mizota Industrial Co., Ltd., Japan

[21] Appl. No.: 253,197

[22] Filed: Oct. 4, 1988

[51] Int. Cl.[4] .............................................. B01D 33/00
[52] U.S. Cl. ................................... 210/747; 210/154; 210/921; 405/80; 405/104
[58] Field of Search ................ 60/398; 210/153, 154, 210/156, 170, 220, 241, 747, 921; 290/53, 54; 405/75, 78, 80, 108, 104–106; 417/2, 3, 53, 62

[56] References Cited

U.S. PATENT DOCUMENTS

| 2,061,169 | 11/1936 | Philips | 405/108 |
| 2,672,985 | 3/1954 | Nordell | 210/154 |
| 3,168,813 | 2/1965 | Sockel | 405/80 |
| 4,110,216 | 8/1978 | Wagnon et al. | 210/170 |
| 4,117,676 | 10/1978 | Atencio | 60/398 |
| 4,229,142 | 10/1980 | LeDall et al. | 417/62 |
| 4,358,220 | 11/1982 | Atencio | 405/75 |
| 4,381,645 | 5/1983 | Galuska | 60/398 |
| 4,466,244 | 8/1984 | Wu | 60/398 |
| 4,548,712 | 10/1985 | Reid | 210/220 |

FOREIGN PATENT DOCUMENTS

| 0071401 | 6/1979 | Japan | 417/3 |
| 565883 | 2/1981 | Japan | 405/104 |
| 0013290 | 1/1982 | Japan | 417/2 |
| 0008818 | 1/1984 | Japan | 210/154 |

Primary Examiner—Richard V. Fisher
Assistant Examiner—Joseph Drodge

[57] ABSTRACT

A pumping system for gates wherein a sluice body liftably received in the guide grooves formed in the side walls of a water channel mounts a plurality of pumps in parallel with each other, the suction ports and the discharge ports of the pumps being located in the upstream and downstream sides, and a debris collecting device is provided in the water channel upstream the pumps. The suction ports of the pumps are opened towards the bottom of the water channel at a given height, and the debris collecting device is so constructed that it can be liftable over the level of the water channel. At the time of a natural drainage, the sluice body and the debris collection device are lifted to allow free flow of the water through the water channel, while at the time of a forced drainage the sluice body and the debris collecting device are lowered so that debris, etc. flowing in the upstream side of the water channel are first collected by the debris collecting device, and the water is then pumped from the upstream to the downstream sides by the suction thereof through the pit.

4 Claims, 5 Drawing Sheets

4,877,537

PUMPING SYSTEM FOR GATES

BACKGROUND OF THE INVENTION

1. Field of the Invention

The present invention relates to a pumping system for gates, and more particularly to a pumping system for gates wherein a plurality of pumps are mounted to the liftable shifting sluice body.

2. Description of the Prior Art

In the conventional drainage canal, as shown in FIG. 8 of the attached drawings the natural drainage canal 28 is partitioned by a gate or sluice 25 at the downstream side and a switching gate or sluice 27 at the upstream side, and a pumping equipment 29 is installed near the drainage canal 28 upstream of the switching gate 27 in parallel therewith. Both gates 25 and 27 are usually open so as to carry out a natural drainage through the drainage canal 28 from the upstream side to the downstream side. However, when the water level in the downstream side becomes higher than that in the upstream side so that the natural drainage is impeded, the switching gate 27 is closed to prevent a countercurrent from occurring, and the pumps in the pumping equipment 29 are operated so that a forced drainage is carried out.

For this installation, an exclusive site having a broad area, a large foundation work for the civil engineering work and large buildings are required. In order to avoid these disadvantages a gate has already been proposed wherein a plurality of pumps are mounted to the liftable sluice body of a sluice in parallel with each other, and a forced drainage takes place by pumping the water in the upstream side to the downstream side, while a natural drainage takes place by raising the sluice body to open the water channel. See Patent Publication No.5883/1971.

However, in practicing this gate, at the time of the forced drainage, as the diameter of the pump becomes large, the necessary sank depth for the sluice body becomes large. Therefore, the weight of the sluice body becomes large and the net pump head of the pumps becomes large. Further, this causes the power for the pumps to increase, making the power of the motors and the initial power receiving capacity to be large. Moreover, when the necessary sank depth of the sluice body becomes large, since it becomes difficult to lower the water level of the upstream side, the difference in water level between the upstream and downstream sides or the pump head is decreased, causing a problem in that a sufficient drainage is not carried out. Another problem resides in that when the sluice body is raised at the time of the natural drainage the screens mounted at the upstream side are left as they are so that a smooth water flow is impeded.

SUMMARY OF THE INVENTION

It is an object of the present invention to provide a pumping system for gates which can increase the drainage capacity at the time of a forced drainage to perform a sufficient drain, improving the drainage efficiency, while at the time of a natural drainage the water flow from the upstream to the downstream sides is not disturbed.

In order to attain the above object the present invention is characterized in that the sluice body liftably inserted at both sides within the guide grooves formed in the gate is provided with a plurality of pumps which are in parallel with each other, the suction ports of the pumps being opened at the upstream side, while the discharge ports of the pumps are opened at the downstream side, and that a debris collecting device is provided in the upstream side of the water channel upstream of the gate, and that the suction ports of the plurality of the pumps open towards the bottom of the water channel and the debris collecting device is supported so as to be liftable above the water channel, the debris collecting device being provided with lift means therefor.

BRIEF DESCRIPTION OF THE DRAWINGS

This and other objects of the present invention will become more readily apparent from the following description and the accompany drawings, in which.

DESCRIPTION OF THE PREFERRED EMBODIMENTS

Figure 1:
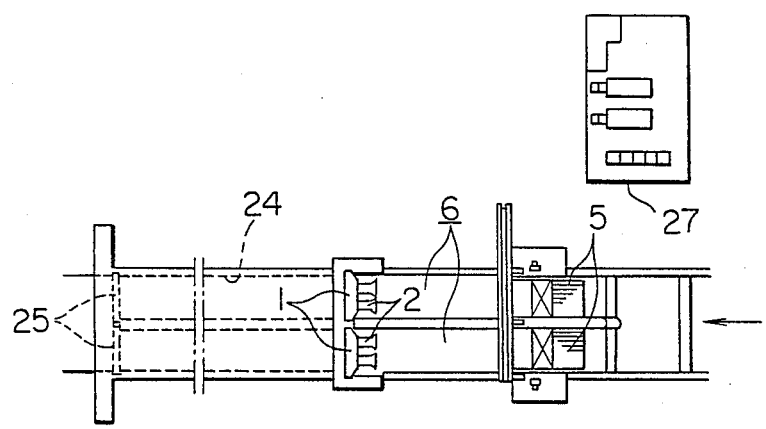
FIG. 1 is a diagrammatical plan view of a pumping system in accordance with the present invention as a whole.
Figure 2:
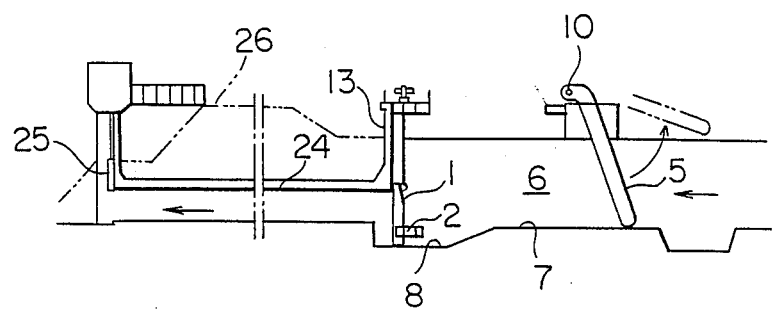
FIG. 2 is a longitudinal sectional view of FIG. 1.
Figure 3:
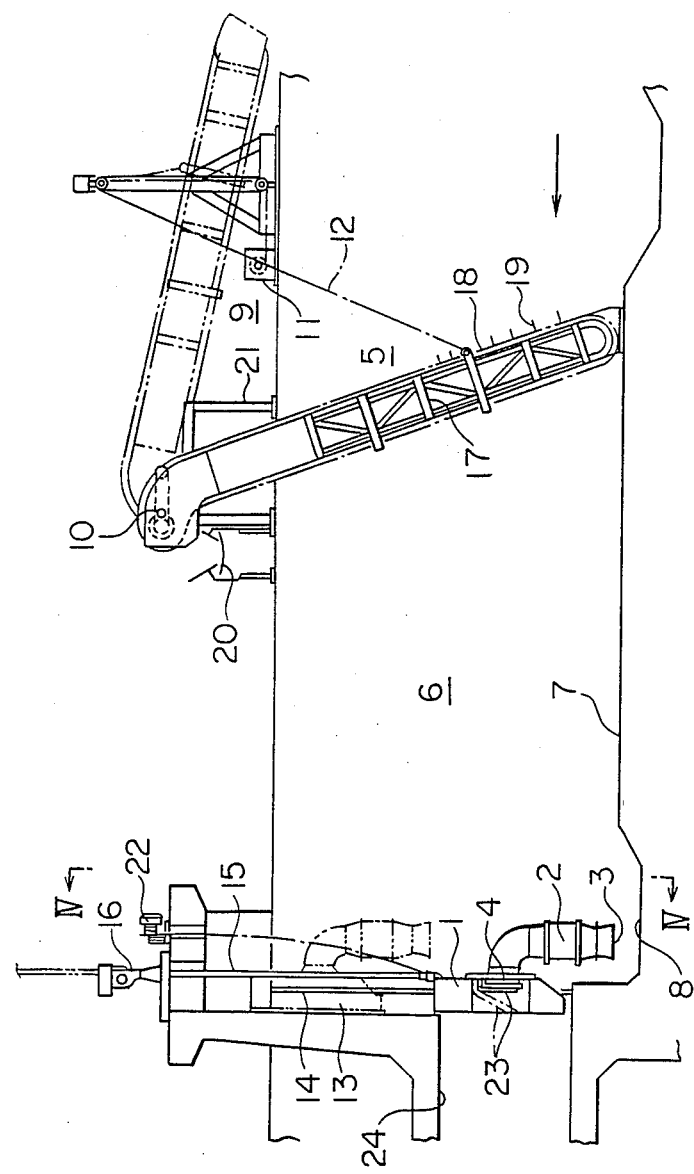
FIG. 3 is a longitudinal sectional view of the principal portion of the system shown in FIGS. 1 and 2.

Referring now to FIGS. 1 to 4 of the drawings, two sets of sluices 13 are provided in the water channel 6 in parallel with each other. The sluice body 1 of the sluice 13 has its both sides liftably shiftably received in the guide grooves 14 each formed in the side walls of the water channel 6, respectively, so as to be liftable. The sluice body 1 has lift bars 15 vertically elongated from its upper edge, the lift bars 15 being adapted to be drivingly connected to lift drive means 16 mounted on the upper beam of the sluice 13 so that the sluice body 1 is adapted to be liftable by the lift bars 15 and the driving means 16. The sluice 1 is provided with a plurality, two in the embodiment shown, of vertical or horizontal type pumps 2 of the conventional constitution in parallel with each other, the suction ports 3 thereof being located in the upstream side of the water channel 6, and the discharge ports 4 are opened in the downstream side of the water channel 6. The suction ports 3 are opened towards the bottom 7 of the water channel 6 at a given height from the bottom 7 so that the setting level of the pumps 2 relative to the water channel 6 can be lowered. In this case, if required, the suction ports 3 may be positioned within a pit 8 formed in the bottom of the water channel 6 at a predetermined depth as shown in FIG. 3 in order to further lower the suction level of the pumps 2 relative to the water level in the water channel 6.

Additionally, within each of the water channels 6 is provided a debris collecting device 5 of an appropriate construction upstream of the pump 2, which basically comprises, in the embodiment shown, an endless chain 18 provided with a number of scrapers 19 mounted so as to protrude outwards. Thus, when operated the debris collecting device 5 can rake up flowing debris, etc. over the water channel 6 and recover them on a transport conveyer 20 set on the upper wall of the water channel 6. A frame 17 of the debris collecting device 5 has its upper portion pivotally connected to a fixed frame 21 mounted on the upper wall of the water channel 6 through a horizontal axis 10 so as to be liftable from the position indicated by the solid lines in FIG. 1 to the position indicated by the phantom lines. To this end a lifting device 9 is provided on the upper wall of the water channel 6 which comprises a winch 11 mounted on the upper wall of the watr channel 6 and a wire rope 12 connected between the winch 11 and the lower part of the frame 17. Thus, when the winch 11 is operated, the frame 12 can be raised or lowered through the wire rope 12. In the drawings the reference numeral 22 represents a cable reel for the pumps 2, 23 a non-return flap valve provided at the discharge port 4 of the pump 2, 24 a culvert of the downstream side, 25 gates at the downstream side of the culvert 24, 26 a main trunk sewer embarkment, and 27 (FIG. 1) is a power distribution.

Figure 4:
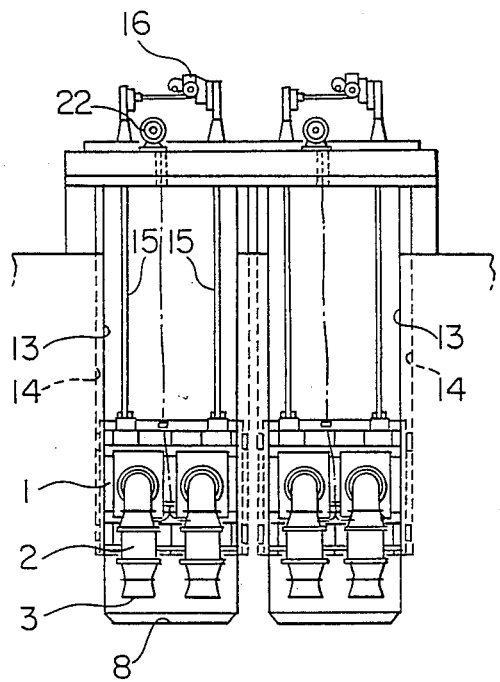
FIG. 4 is a sectional view taken along the lines IV—IV in FIG. 3.
Figure 5:
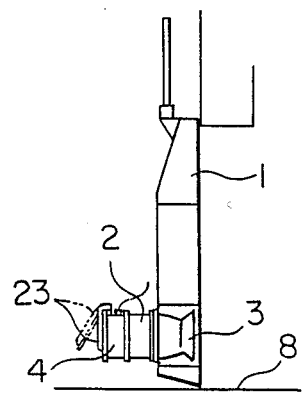
FIG. 5 is a view showing an alternative embodiment of the pump shown in FIGS. 3 and 4.

FIG. 5 shows an alternation of the pump 2 shown in FIGS. 3 and 4. Although in FIGS. 3 and 4 the pump 2 is shown as a vertical type pump, in the embodiment shown in FIG. 5 the pump 2 is embodied as a horizontal type pump, but no substantial differences in operation and effects between these two types can be found.

Figure 6:
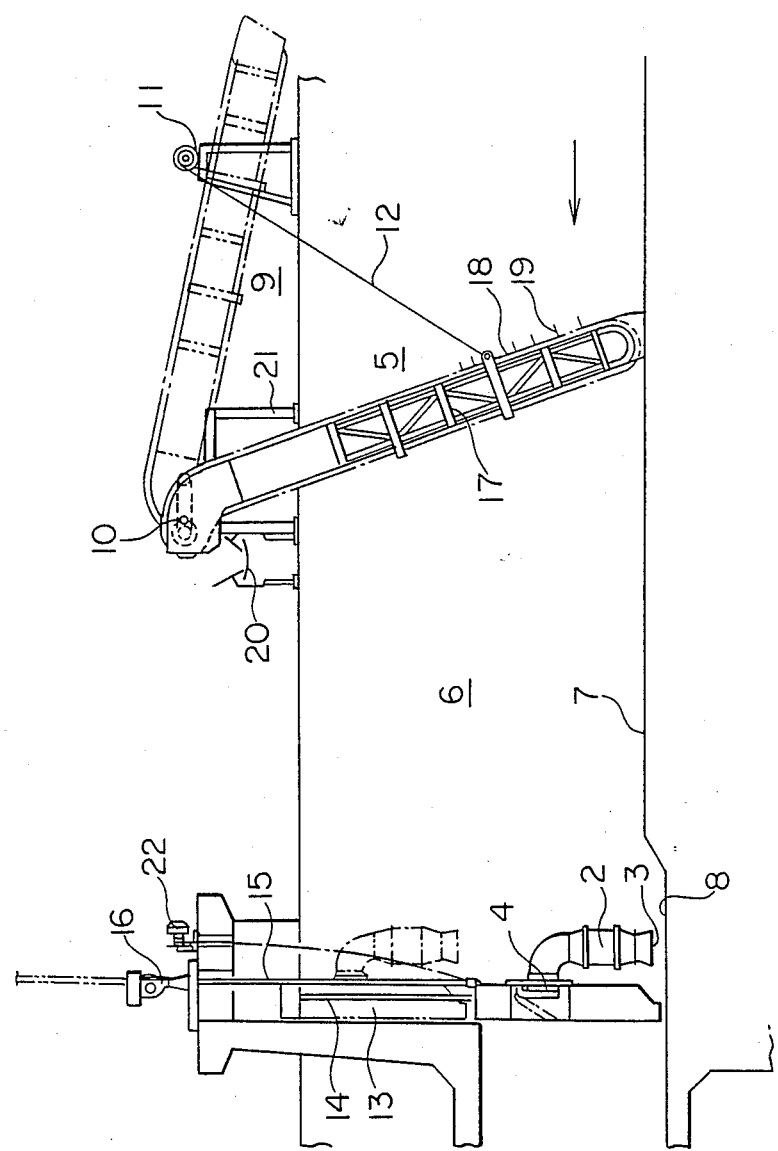
FIG. 6 is a similar view to FIG. 3, but showing another embodiment of the present invention.
Figure 7:
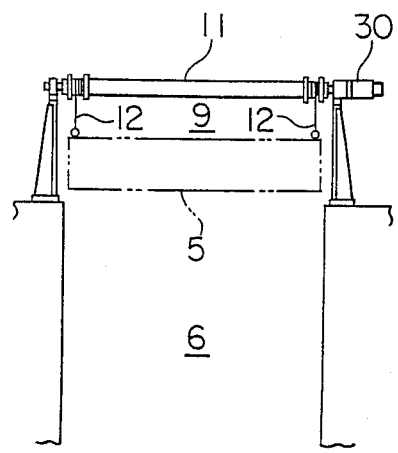
FIG. 7 is a diagrammatical side elevational view of the winch portion shown in FIG. 6.
Figure 8:
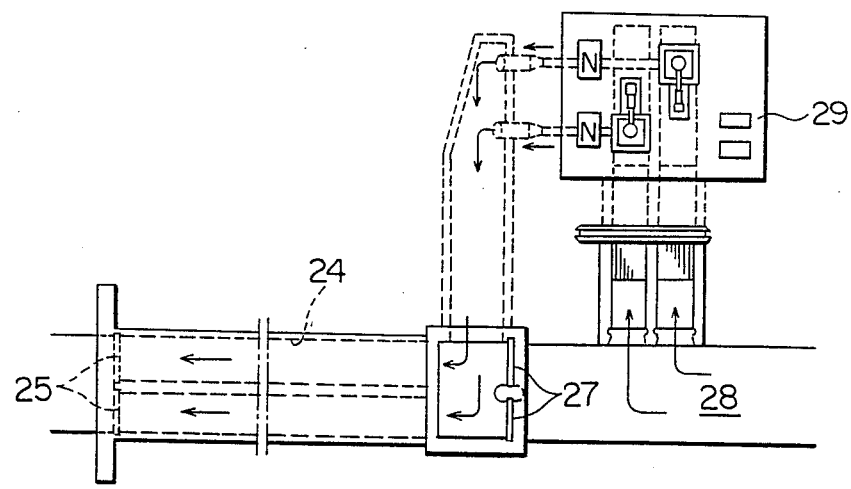
FIG. 8 is a plan view of a conventional pumping system.

Further, in FIGS. 6 and 7 another embodiment of the present invention is shown. This embodiment differs from that shown in FIGS. 3 and 4 in the point that although in the former embodiment the pit 8 is formed at a limited region below the suction ports 3 of the pumps 2, in the latter embodiment the pit 8 is elongated over the above region to the downstream side of the water channel 6. This embodiment is advantageous over the previous embodiment in that it eliminates fear of accumulation of debris in the pit 8 which impeds a natural drainage or disturbs a smooth suction of the water at the time of a forced drainage. Additionally, the reference numeral 30 in FIG. 7 represents a reversible motor with a reduction gear for the winch 11.

Thus, in the present invention, at the time of the forced drainage the sluice body 1 is lowered to close the water channel 6, and at the same time the debris collecting device 5 is lowered into the water channel 6. Upon operation of the debris collecting device 5, debris, etc. are removed from the water channel 6. On operation of the pumps 2, the water in the upstream side can be pumped to the downstream side. In this case, since the suction ports of the pumps 2 are opened towards the bottom 7 of the water channel or within the pit 8 formed in the bottom 7 of the water channel 2 so that the pumps 2 are supported near the bottom 7, not only the necessary depth of the suction ports 3 are sufficiently assured, but also the water level in the upstream side is made lower to sufficiently discharge the water to the downstream side. On the other hand, at the time of the natural drainage the operation of the debris collecting device 5 is stopped and it is raised over the water channel 6, the sluice body 1 being lifted to open the water channel 6. Accordingly the natural drainage can effectively and smoothly take place without the water flow being disturbed by the debris collecting device 5. Although the present invention has been described with reference to preferred embodiments, persons skilled in the art will recognize that changes may be made in form and detail without departing from the spirit and scope of the invention.

What is claimed is:

1. A method of providing a pumping system for gates comprising the steps of forming a sluice body which is liftably received at its both sides witin the guide grooves formed in the side walls of a water channel; mounting a plurality of pumps in parallel with each other with the suction ports of said pumps being located at the upstream side of said water channel and also being opened towards the bottom therof, and with the discharge ports of said pumps being located at the downstream side of said water channel; mounting a debris collecting device in the upstream side of said water channel on lift means so as to be liftable over said water channel; and lowering said sluice body at the time of lowering said debris collecting device, while raising said sluice body at the time of raising said debris collecting device.

2. The method of claim 1, and comprising the step of aligning the pumps generally vertically.

3. The method of claim 1, and comprising the step of aligning the pumps generally horizontally.

4. The method of claim 1, and comprising the steps of mounting said debris collecting device on a frame whihh is swingably supported at an upper end portion thereof on the upper wall of said water channel, and providing said lift means on said upper wall of said channel with a wire rope wherein one end of said wire rope is connected to the lower portion of said frame.

* * * * *

UNITED STATES PATENT AND TRADEMARK OFFICE
CERTIFICATE OF CORRECTION

PATENT NO. : 4,877,537

DATED : October 31, 1989

INVENTOR(S) : Ichiji Kobayashi et al

It is certified that error appears in the above-identified patent and that said Letters Patent is hereby corrected as shown below:

In this patent's heading section, include the additional entry as follows: FOREIGN APPLICATION PRIORITY DATA October 14, 1987     Japan (Utility Model Application) --62-157330--.

Signed and Sealed this

Fourth Day of December, 1990

*Attest:*

HARRY F. MANBECK, JR.

*Attesting Officer*        *Commissioner of Patents and Trademarks*